United States Patent
Napolitano

(10) Patent No.: US 9,663,200 B2
(45) Date of Patent: May 30, 2017

(54) SYSTEM AND METHOD FOR THE NAVIGATION OF A MOVABLE VEHICLE, SUITABLE FOR DETERMINING AND DISPLAYING A SAFE NAVIGATION ZONE

(71) Applicant: IXBLUE, Marly le Roi (FR)

(72) Inventor: Fabien Napolitano, Mareil Marly (FR)

(73) Assignee: IXBLUE, Marly le Roi (FR)

( * ) Notice: Subject to any disclaimer, the term of this patent is extended or adjusted under 35 U.S.C. 154(b) by 0 days.

(21) Appl. No.: 14/436,621

(22) PCT Filed: Oct. 16, 2013

(86) PCT No.: PCT/FR2013/052469
§ 371 (c)(1),
(2) Date: Apr. 17, 2015

(87) PCT Pub. No.: WO2014/060698
PCT Pub. Date: Apr. 24, 2014

(65) Prior Publication Data
US 2016/0167750 A1    Jun. 16, 2016

(30) Foreign Application Priority Data

Oct. 19, 2012 (FR) ...................................... 12 59999

(51) Int. Cl.
*B63B 49/00* (2006.01)
*G01C 21/16* (2006.01)
*G01C 21/20* (2006.01)

(52) U.S. Cl.
CPC .............. *B63B 49/00* (2013.01); *G01C 21/16* (2013.01); *G01C 21/203* (2013.01)

(58) Field of Classification Search
CPC .............................. G01C 21/12; B63B 49/00
See application file for complete search history.

(56) References Cited

U.S. PATENT DOCUMENTS 6,304,513 B1 * 10/2001 Billon ................. G01S 7/52004
                                                                  367/88
7,584,020 B2 * 9/2009 Bruemmer ............. G06N 3/008
                                                                  318/567
(Continued)

OTHER PUBLICATIONS

Hansen, R.E. et al., "Signal processing for AUV based interferometric synthetic aperture sonar", Oceans 2003. MTS/IEEE Proceedings. Celebrating the Past, Teaming Toward the Future, San Diego, CA, Sep. 22-26, 2003, Oceans MTS/IEEE Conference Proceedings, Columbia ,MD: Marine Techn. Soc. US, vol. 5 of 5, Sep. 22, 2003, pp. 2438-2444, XP010694872.*

(Continued)

*Primary Examiner* — Behrang Badii
*Assistant Examiner* — Daniel L Greene
(74) *Attorney, Agent, or Firm* — Young & Thompson

(57) ABSTRACT

A system and a method for the navigation of a mobile vehicle, suitable for determining and displaying a safe navigation zone for the mobile vehicle. The navigation system includes a dead reckoning navigation system (10), a calculator (50), a storage memory (60), an embedded sensor (20), and an electronic mapping system (70). The calculator (50) is suitable for calculating an estimated position of the mobile vehicle from speed and/or acceleration measurements and a comparison of the measurement of an environmental parameter with a geographical database. The calculator (50) is suitable for calculating the probability density of the presence of the mobile vehicle around each point on the map in order to deduce a safety zone (12) corresponding to a presence probability higher than, or equal to, a predetermined threshold p.

20 Claims, 3 Drawing Sheets

(56) References Cited

U.S. PATENT DOCUMENTS

| | | | |
|---|---|---|---|
| 2005/0234646 A1* | 10/2005 | Watts | G01W 1/00 702/3 |
| 2009/0175128 A1* | 7/2009 | Jean | G01S 15/8904 367/88 |
| 2010/0238161 A1* | 9/2010 | Varga | G06T 19/006 345/419 |
| 2012/0022784 A1 | 1/2012 | Louis et al. | |

OTHER PUBLICATIONS

Jalving, B. et al., "A toolbox of aiding techniques for the HUGIN AUV integrated inertial navigation system" Oceans 2003, MTS/IEEE Proceedings. Celebrating the Past, Teaming Toward the Future, San Diego, CA, Sep. 22-26, 2003, Oceans MTS/IEEE Conference Proceedings, Columbia, MD: Marine Techn. Soc., US, vol. 5 of 5, Sep. 22, 2003, pp. 1146-1153.*

Pawel Zalewski: "Models of DP systems in full mission ship simulator" Scientific Journals Maritime University of Szczecin, vol. 20. No. 92. Jan. 1, 2010 (Jan. 1, 2010). pp. 146-152. XP002712126, Szczecin ISSN: 1733-8670 figure 9.

International Search Report, dated Feb. 3, 2014, from corresponding PCT application.

* cited by examiner

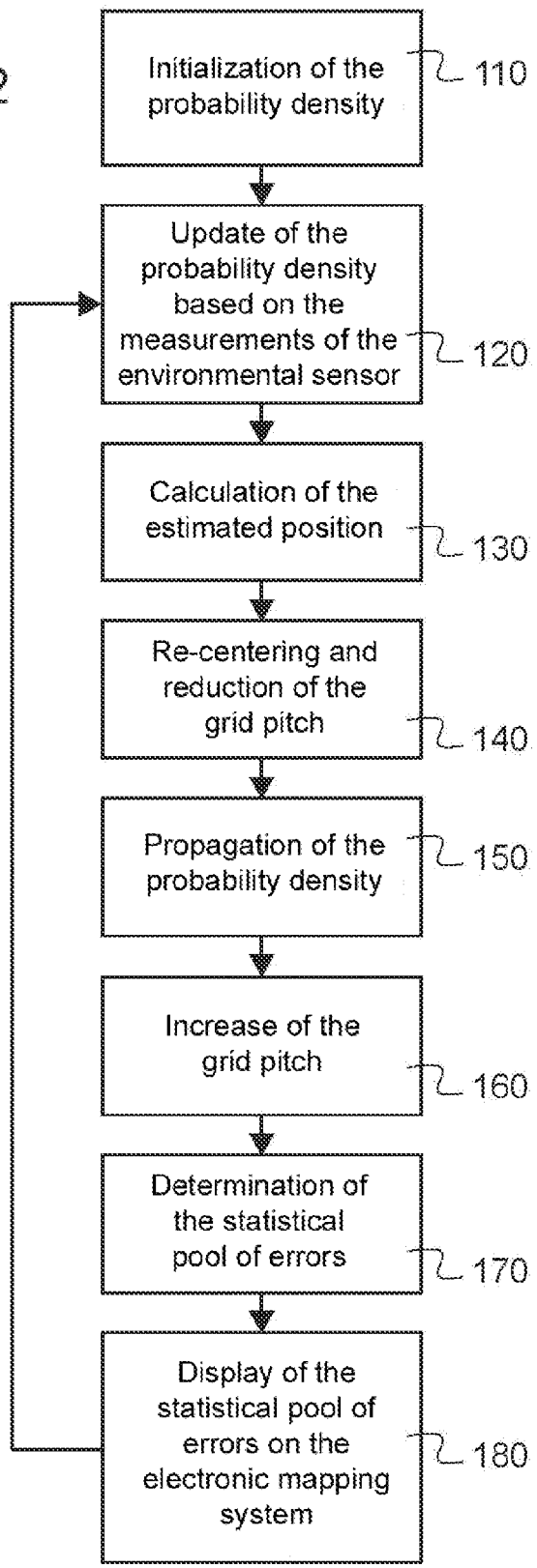

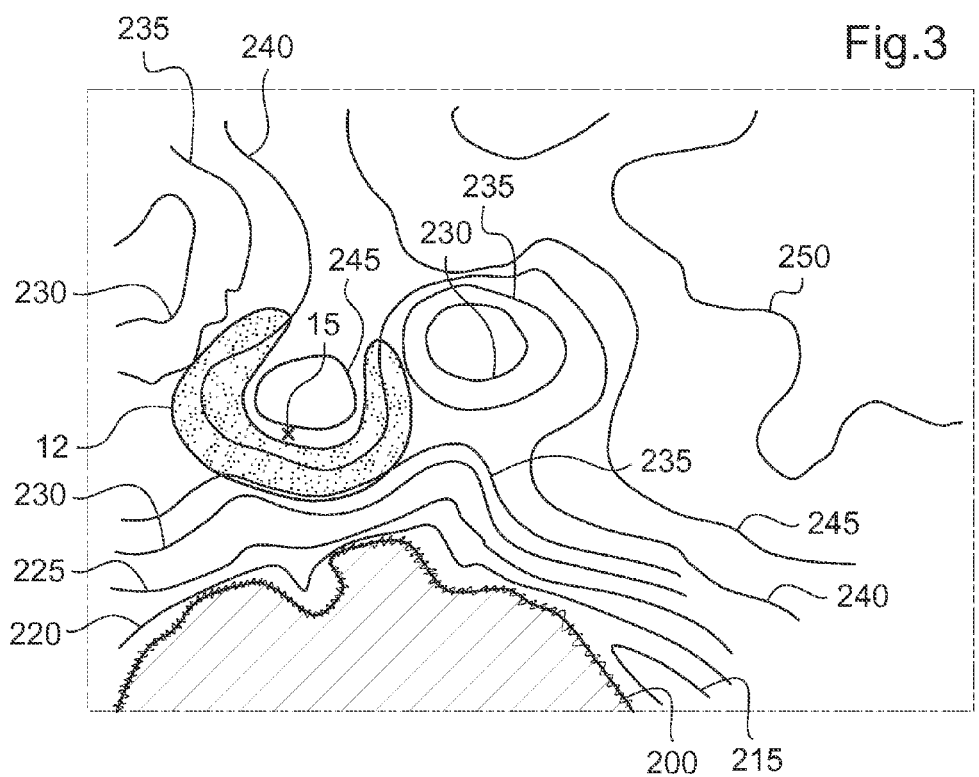
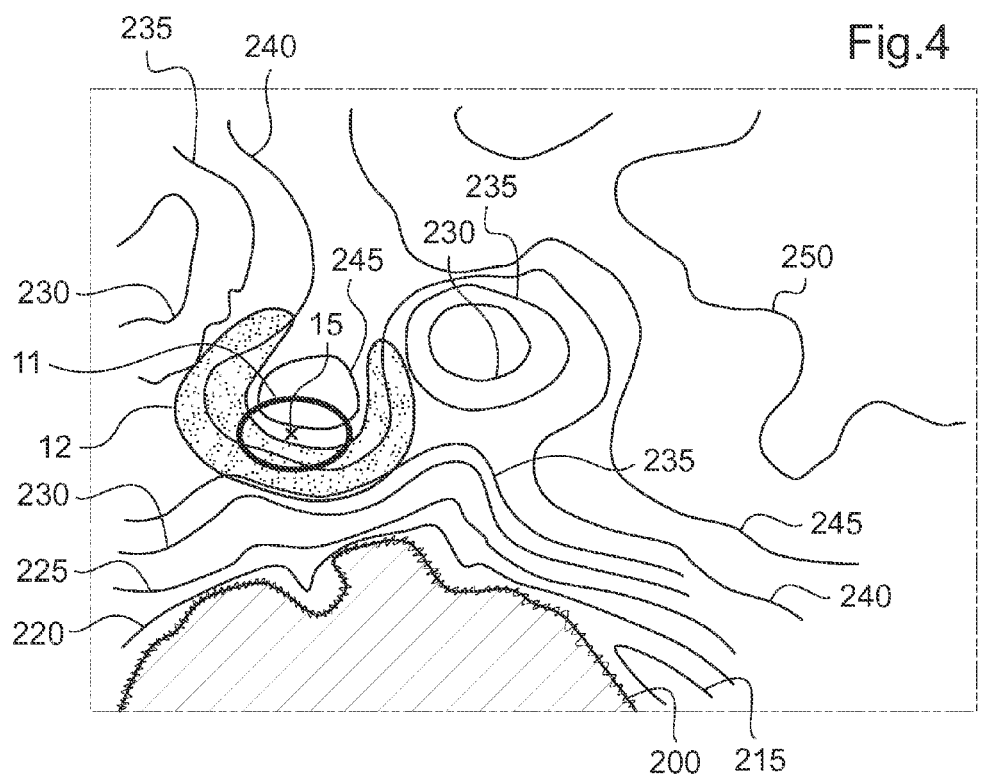

SYSTEM AND METHOD FOR THE NAVIGATION OF A MOVABLE VEHICLE, SUITABLE FOR DETERMINING AND DISPLAYING A SAFE NAVIGATION ZONE

BACKGROUND OF THE INVENTION

Field of the Invention

The present invention relates to the navigation systems for a mobile vehicle, for example boats and underwater vehicles, and more precisely to the systems allowing to improve the safety of navigation thanks to the determination of a safety zone around a boat.

Description of the Related Art

There exist many methods allowing to determine the position of a boat, among which can be mentioned:

- the radio-navigation methods (GPS, LORAN, long acoustic base . . . ). These methods allow to position the boat with respect to a reference network provided that the transmission of the waves between the network and the boat is possible;
- the dead reckoning navigation methods, which also include the inertial navigation methods. These methods allow to position the boat based on an initial position by integrating instantaneous speed or acceleration measurements. Accurate over the short term, the dead reckoning navigation tends to become inaccurate over the long term due to the accumulation of the integrated errors of the sensors; and
- the terrain navigation methods. These methods consist in using measurements of the environment made by the boat (altimetry, gravimetry, . . . ) and in deducing the position of the mobile vehicle by comparison to a reference map.

Used jointly with electronic mapping means, for example a system of the ECDIS (Electronic Chart Display Information System) type, these methods allow to represent the estimated position of the boat on a geographic map.

During navigation in waters having obstacles to navigation, and in particular in shallow sea floor, it is not sufficient to have an estimation of position. It is also required to be able to determine a safety zone around the boat in order to take into account the potential errors of the navigation means. The availability of safety zone information allows to trigger alerts when the position of the boat risks to cross a dangerous navigation zone, for example an isobath determined as a function of the minimum water height necessary to the navigation of the boat, the position of the boat and the isobath being shown on the geographic map.

In order to allow a maximum extension of the accessible zones while ensuring the safety of the boat, it is important that the safety zone be determined accurately without the extent thereof be neither underestimated nor overestimated.

When the boat or the submarine is equipped with a sounder allowing to determine the depth of water under the boat, which is generally the case, there exists a traditional navigation method called "flaque de navigation" in the French terminology, and "pool of errors" in the English terminology, which allows to determine such a zone.

The pool-of-errors method is a method that can be implemented graphically and with no calculation, consisting in determining a safety zone about the position of the boat, called pool of errors, based on the sounder information and on the isobaths of the map, then in displacing this zone over time by taking into account the boat speed and the uncertainty thereof due to the current, for example. This method provides the user with easily intelligible information (the safety zone) that correctly take into account the speed uncertainty accumulation and the non-linearity of the problem. In particular, this method allows to determine navigation zones of any shape. Historically used manually on tracing papers, it is today implanted in electronic mapping systems of the ECDIS type.

The pool-of-errors method is based on the hypothesis, fundamentally false, that the probability of presence of the boat in the pool of errors is uniform. Moreover, the use thereof requires, so as not to place the boat in danger, to strongly overestimate the impact of the tidal errors on the sounding points because it is not adapted to a fine taking into account of these errors. These two points, which are the back side of the method simplicity, lead in practice to favour the robustness to the detriment of the accuracy of determination of the safety zone. Hence, the traditional pool-of-errors method leads to widely overestimate the safety zone, which strongly limits the capacities of operation of the boat.

On the other hand, there exist since several years mathematical methods of non-linear filtering allowing to accurately calculate the probability density of presence of a mobile vehicle on a map, by comparing the measurements of a sounder-type instrument with the bathymetry information contained in a geographical data base. The state of the art of these methods may be found for example in the following publications: Fredrik Gustafsson, Particle Filter Theory and Practice with Positioning Applications, 2010, IEEE Aerospace and Electronic Systems Magazine (25), 7, 53-81 and Niclas Bergman, Lennart Ljung and Frederik Gustafsson, "Terrain Navigation using Bayesian Statistics" IEEE Control Systems Magazine, 1999. The patent document US2012/0022784_A1 also describes a Terrain Aided Navigation (TAN) system comprising a non-linear filtering to estimate the conditional probability distribution of a set of measurements.

By construction, these methods calculate in an approached manner the probability density of presence of the mobile vehicle along the map. From the point of view of the presence probability density estimation, they tend towards the optimum solution, provided that a sufficient calculation power is available to faithfully take into account the different parameters of the model of error. In practice, the use of such methods requires making several simplifying hypotheses, but they nevertheless remain far higher than the linear filtering methods.

Given that the presence probability density is an extremely complex indicator and, in particular, it is not an indicator directly intelligible for a human operator, the non-linear filtering methods produce simpler standard indicators. In particular, the standard indicators used correspond to the statistics of order 1 and 2 of the calculated probability distribution, i.e. the least-squares mean and the correspondent covariance (see for example Gustaffson Equations (7a) and (7b)).

These indicators are easily understandable for an operator, all the more that they are identical in their principles to the conventional indicators issued by the linear filtering methods used in most of systems and to which the operators are hence used. Unfortunately, they are very badly adapted to the navigation in zones having dangerous obstacles and the use thereof may lead to significant risks for the safety.

On the one hand, the least-squares mean, which corresponds to the best available estimate of the position, is not, even generally, a point where a non-zero presence probability exists. For example, if the pool-of-errors method and one of the moderns non-linear filtering methods are used jointly, the case will often be one where the estimated position issued by the non-linear filter is not contained in the pool of errors: in such a case, the boat cannot be at the position estimated by the least-squares mean. On the other hand, the position error covariance neither allows to faithfully represent the extent of the navigation uncertainty: its natural representation corresponds to an ellipse, centred on the least-squares-estimated mean, which has been seen as not being pertinent, whereas the navigation uncertainty is generally a zone of far more complex shape (corresponding to the non-linearity of the problem) and hence very different from an ellipse.

Hence among the two types of methods available today: the conventional pool of errors, on the one hand, and the modern non-linear filtering methods, on the other hand, no one allows to respond correctly to the problem of navigation safety in waters having potentially obstacles. The conventional pool-of-errors method provides, as the condition to be correctly implemented, a robust and easily usable estimation of the safety zone. On the other hand, it is widely under optimum, which leads to strongly restrict the field of operations. Moreover, the conventional pool-of-errors method is a graphical method generally implemented on tracing papers that are manually displaced with respect to a sea floor map. As regards the modern non-linear filtering methods, they are able to estimate relatively accurately the whole presence probability density, which in theory corresponds to the whole information required to ensure the navigation jointly with the map of the operation zone. On the other hand, these methods do not propose directly intelligible indicators or else propose indicators, issued by the linear filtering methods such as the least-squares mean and the covariance, the use of which compromise the navigation safety.

The simultaneous use of the conventional pool-of-errors method and the modern non-linear filtering methods neither allows to solve the problem of safety but accumulate the drawbacks of each of the methods, all the more that, as seen hereinabove, these two methods can give contradictory results.

It hence exists a need for a system and a method for determining a navigation safety zone that, while having the robustness and the simplicity of presentation of the conventional pool-of-errors method, are capable of determining accurately this safety zone and taking into account the non-linearity of the problem of determination of the estimated position.

The availability of such a system and such a method would hence allow to ensure the safety of navigation without thereby restricting uselessly the field of operations.

SUMMARY OF THE INVENTION

The present invention has for object to remedy these drawbacks and relates to a navigation system for a mobile vehicle adapted to determine and display a navigation safety zone for the mobile vehicle, the system of navigation comprising a dead reckoning navigation system adapted to produce a series of measurements of the mobile vehicle position variation over time, a calculator, a storage memory, an embedded sensor on the mobile vehicle to acquire a series of measurements of an environmental parameter as a function of time; an electronic mapping system comprising a display device and connected to a reference geographical data base of the environmental parameter, the electronic mapping system allowing to determine for each point of a geographical map the reference value of the environmental parameter. The calculator is connected to the storage memory, to the geographical data base, to the dead reckoning navigation system and to the electronic mapping system.

According to the invention, the calculator is adapted to calculate the probability density of presence of the mobile vehicle around each point of the map at each instant t, based on the series of position variation measurements of the dead reckoning navigation system, on the series of measurements of the environmental parameter, and on the reference geographical data base of the environmental parameter, to deduce therefrom a safety zone corresponding to a presence probability higher than or equal to a predetermined threshold p and the electronic mapping system is adapted to represent said safety zone on the display device.

The invention hence allows to accurately determine and display to the user a safety zone corresponding to a chosen presence probability.

According to advantageous characteristics of particular embodiments of the invention:

the calculator is adapted to calculate a two-dimension presence-probability-density estimation matrix representing the probability density of presence of the mobile vehicle, each point of the presence-probability-density estimation matrix corresponding to a point of the geographical map defined by homothetic transformation of the spatial coordinates, each coefficient of the presence-probability-density estimation matrix corresponding to the probability of presence of the mobile vehicle in a square around this point, and the storage memory is adapted to record at each instant said presence-probability-density estimation matrix;

the calculator is adapted to calculate an error matrix, of same size and same pitch as the presence-probability-density estimation matrix, each coefficient of the error matrix corresponding to an estimation of one or several auxiliary parameters of error of the system for each point of the map and wherein the storage memory is adapted to record said error matrix at each instant.

Advantageously, the calculator is adapted to calculate recursively the probability density of presence of the mobile vehicle around each point of the map at each instant t, with the following steps of processing:

a step of initialization of the probability density based on an initial position uncertainty value;

a step of correction of the probability density performed at each acquisition of a measurement of the environmental parameter;

a step of propagation of the probability density performed at each acquisition of a measurement of the mobile vehicle position variation produced by the dead reckoning navigation system.

According to particular embodiments:

the step of propagation includes a step of calculation of mobile vehicle displacement uncertainty of by combination of the mobile vehicle speed uncertainty and position uncertainty and wherein the step of propagation includes a step of convolution of the displacement error probability density with the presence probability density; and possibly the step of propagation of the error matrix coefficients includes a step of convolution of the displacement error probability density with the error matrix.

Advantageously, the calculator is adapted to use a covariance value common to all the points of the error matrix, said covariance value being suitable to represent the uncertainty of the auxiliary parameter(s) at each point of the error matrix and wherein the step of correction is performed by means of a linear filtering process on each of the coefficients of the error matrix, said linear filtering process having a gain common to all the coefficients.

Preferentially, the calculator is adapted to:

sort all the coefficients of the presence-probability-density estimation matrix of the mobile vehicle, determine the smallest sub-set of coefficients whose sum is higher than $p/\epsilon^2$, where $\epsilon$ is the pitch of the geographic grid corresponding to the elementary size of the squares of the probability density matrix, combine the elementary zones of the matrix around each of the retained coefficients, deduce at least one safety zone corresponding to a presence probability higher than or equal to a probability threshold p.

Advantageously, the navigation system is adapted to determine a plurality of disjoint zones corresponding to a presence probability higher than or equal to a threshold p, and the calculator is adapted to determine the smallest convex zone containing the disjoint zones and to form a convex safety zone.

Preferably, the mobile vehicle is a marine or underwater vehicle and the embedded sensor includes a depth sounder adapted to determine the depth of water under the marine or underwater mobile vehicle down to the sea floor, or a gravimetric sensor or a sea current sensor.

Advantageously, the navigation system further includes a device for predicting tidal values over time at the estimated position of the mobile vehicle.

According to particular aspects of the navigation system:

the error matrix coefficients correspond to an estimation of the tidal error;

the error matrix coefficients correspond to an estimation of the environmental sensor measurement error;

the calculator is adapted to calculate a plurality of safety zones (12) corresponding to different predetermined presence probability thresholds, respectively, and wherein the electronic mapping system (70) is adapted to represent said plurality of safety zones (12) on the display device.

The invention also relates to a navigation method for a mobile vehicle, preferably a marine or underwater vehicle, the method being adapted to determine and display a navigation safety zone for the mobile vehicle, the navigation method comprising:

the acquisition and storage in memory of a series of instantaneous speed and/or acceleration measurements issued by a dead reckoning navigation system, as a function of time, the acquisition and storage in memory of a series of measurements of an environmental parameter by an embedded sensor on-board the mobile vehicle as a function of time;

the calculation at each instant t of the probability density of presence of the mobile vehicle around each point of the map, based on the series of position variation measurements by the dead reckoning navigation system, the series of measurements of the environmental parameter and the reference geographical data base of the environmental parameter, the determination of a safety zone corresponding to a presence probability higher than or equal to a predetermined threshold p, and the representation on a display device of a reference geographical map of the environmental parameter of said safety zone.

The invention hence relates to a navigation method that combines a dead reckoning navigation (for example, inertial navigation) and a terrain navigation, for deducing therefrom an estimated position and a safety zone around this estimated position. It is particularly useful when no radio-navigation is possible.

The invention will find a particularly advantageous application in the navigation of boats and underwater vehicles independently of a radio-navigation system.

The present invention also relates to the characteristics that will be revealed in the following description and that will have to be considered in isolation or according to any technically possible combination thereof.

Hereinafter, the term "mobile" or "mobile vehicle" refers preferably to a boat or an underwater vehicle.

The estimated position of the mobile vehicle is defined as the geographical position of the barycentre of all the possible positions on the map, weighted by the probability of presence around each position.

In the following of the description, the term "safety zone" is equivalent to the term "statistical pool of errors" and represents the whole of the geographical positions for which the mobile vehicle presence probability is higher than a threshold p fixed by the user and stored in memory in the navigation system.

BRIEF DESCRIPTION OF THE DRAWING FIGURES

This description, given by way of non-limitative example, will allow to better understand how the invention can be implemented with reference to the appended drawings, in which:

FIG. 1 schematically shows the different components of a navigation system according to an exemplary embodiment;

FIG. 2 schematically shows the main steps of the method of the invention, from the calculation to the display of the statistical pool of errors on the electronic mapping system;

FIG. 3 shows an example of bathymetric map indicating the isobaths curves of a sea floor in a coast zone and on which are represented the estimated position of a boat and a safety zone calculated according to a preferred embodiment of the method of the invention based on a presence-probability-density estimation matrix at 99%;

FIG. 4 shows the same bathymetric map than FIG. 3, on which are shown the simulation of a safety zone calculated according to the invention and of elliptic-shape zone around the estimated position calculated by the least squares method.

DETAILED DESCRIPTION OF THE INVENTION

Figure 1:
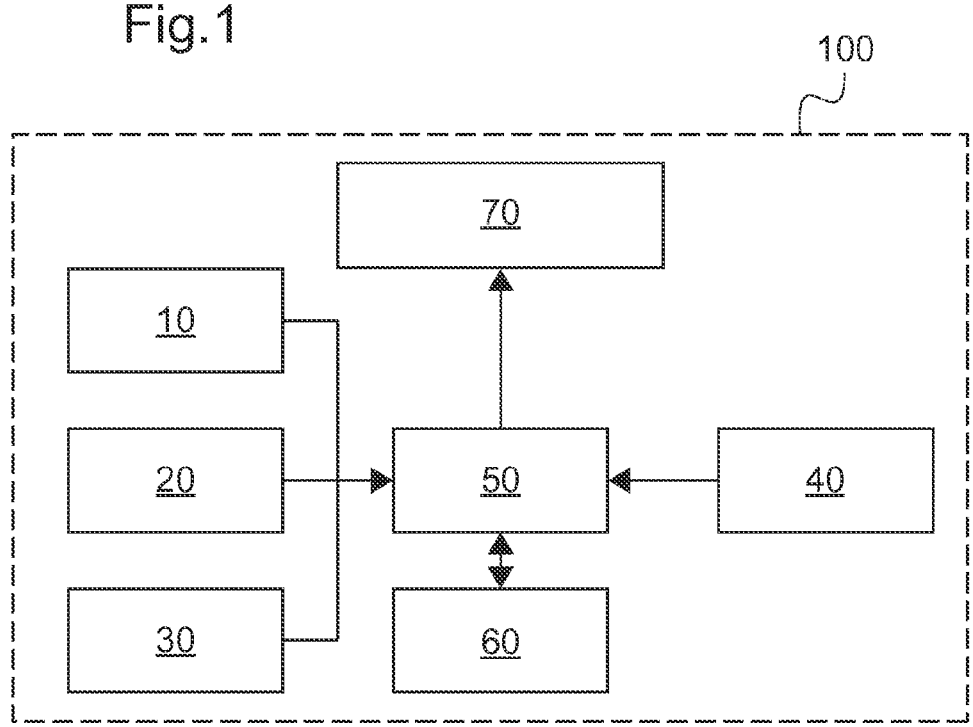

FIG. 1 schematically shows a navigation system 100 according to an embodiment of the invention, comprising:

a dead reckoning navigation system 10 allowing to determine over time the vehicle position variation by integration of the instantaneous speed and/or acceleration measurements as a function of time;

an embedded sensor 20 allowing to measure at least one environmental parameter at each position of the mobile vehicle as a function of time;

a reference geographical data base 40 allowing to determine a priori for each point on the map the value of the considered environmental parameter, corresponding to this point on the map;

a calculator 50 and a storage memory 60;

a display device 70 of the electronic mapping device type.

Advantageously, the navigation system 100 includes a manual or automatic device 30 for predicting tidal values over time at the point of space where the mobile vehicle is located.

In the case where the mobile vehicle is an underwater vehicle, the embedded sensor 20 advantageously comprises a device for measuring the depth of immersion of the vehicle under the sea level.

The calculator 50 is connected to the storage memory 60, to the geographical data base 40, to the electronic mapping device 70, to the dead reckoning navigation system 10, to the embedded sensor 20 and possibly to the tidal value prediction device 30.

FIG. 2 schematically shows the main steps of the method of the invention implemented by the navigation system 100.

The calculator 50 receives over time, at each update by acquisition of new measurements, the position variation information provided by the dead reckoning navigation system 10 and the environmental information of the embedded sensor 20. The storage memory 60 contains at each instant a representation of the probability density of presence of the mobile vehicle at the different points of the map. This probability density is approximately initialized at step 110, based on the measurements of the dead reckoning navigation system 10 or manually by the user. The calculator 50 maintains by a recursive calculation an estimation of the mobile vehicle presence probability density based on the information of the different connected systems (dead reckoning navigation 10, environmental sensor 20, geographical data base 40) and deduces therefrom a safety zone corresponding to the most probable zone in which the mobile vehicle is located with a given probability. This safety zone is then transmitted to the electronic mapping system to be represented, which allows the navigator to optimally control the navigation with respect to the chosen safety constraints.

The navigation system 100 hence allows to determine and display a statistical pool of errors 11.

According to a preferred embodiment, the representation of the mobile vehicle presence probability density is stored as a two-dimension presence-probability-density estimation matrix, or PDF matrix. For example, a PDF matrix of size 2N+1×2N+1 is considered, where N represents an integer number, N being for example equal to 200. The centre of the PDF matrix, i.e. the point of coordinates (N, N) with the coordinates numbered from zero, corresponds to the estimated geographical position of the mobile vehicle. Each point of the PDF matrix corresponds to one point of the map obtained by homothetic transformation of the coordinates, supposing that the distance between two points along a same line or a same column is equal to a value $\epsilon$ called the grid pitch. The value $\epsilon$ is determined during the calculation. Typically, $\epsilon$ is comprised between 0.1 meter and 10 meters. Each point of the PDF matrix corresponds to the probability of presence of the vehicle in a square around this point, whose sizes are equal to the grid pitch.

On other hand, the storage memory 60 may advantageously be used to store in another matrix said error matrix or EP matrix, of same size and same pitch as the presence-probability-density estimation matrix, an estimation of the auxiliary parameters of error of the system 100 for each point of the map. For example, this second EP matrix may advantageously be used to store at each point an estimation of the tidal error, with respect to the prediction, corresponding to the case where the mobile vehicle would be at this point.

So as to simplify the following disclosure, let's consider the case where the environmental sensor 20 is a sounder, i.e. an instrument allowing to determine the depth of water under the mobile vehicle down to the sea floor. In this case, it is supposed that the geographical data base 40 contains at each point of the map the expected value of water depth for a given tidal value. As can be easily seen, the same steps can be applied mutatis mutandis to other environmental sensors, such as for example a gravimeter allowing to measure the field of gravity at the position of the mobile vehicle.

According to a preferred embodiment of the navigation method of the invention illustrated in FIG. 2, the calculation steps are the following:

initialization of the density of probability 110;

update of the probability density based on the measurements of the sounder 120;

calculation of the estimated position based on the presence probability density 130;

re-centering of the grid to the estimated position and reduction of the grid pitch, if possible 140;

propagation of the probability density based on the measurements of the dead reckoning navigation 150;

increase of the grid pitch if necessary 160;

determination of the statistical pool of errors 170;

display of the statistical pool of errors on the electronic mapping device 180.

The step 110 of initialization of the probability density is performed only once at the system power on. This initialization step 110 consists in using quality indicators, available elsewhere, for example the error covariance provided by the dead reckoning navigation system 10, or error covariance information provided by the user. Given a position error covariance $\sigma^2(X)$ and the size 2N+1 of the probability density matrix, it is first defined a grid pitch such that the 3-sigma support of the probability density of covariance $\sigma^2(X)$ occupies exactly a square of size $(2N+1)\epsilon$. Hence, the probability density is initialized with the following formula:

$$PDF(a,b) \leftarrow \frac{1}{\sqrt{2\pi|\det\sigma^2(X)|}} \exp\left(-\frac{\varepsilon^2}{2}(a-N\ b-N)(\sigma^2(X))^{-1}\binom{a-N}{b-N}\right)$$

where (a,b) are the coordinates along the PDF matrix; (N,N) are the coordinates of the matrix centre and $\epsilon$ is the grid pitch in the geographical reference system whose points correspond to the coefficients of the PDF matrix.

At each measurement of a sounding point, the probability density PDF is updated by determining the likelihood of the sounding measured for each point of the map corresponding to a point of the PDF matrix. For that purpose, it is first determined the water depth expected at each point of coordinates (a, b), from which is subtracted the water depth predicted at this point based on the geographical data base and possibly the tidal error estimation at this point:

$$\delta h(a,b) = h_{mesurée} + p_{mesurée} - h_{base\ de\ données}(x_{centre} + (a-N)\epsilon, y_{centre} + (b-N)\epsilon) - EP(a,b)$$

where $\delta h(a,b)$ is the measured sounding error corresponding to the point of coordinates (a,b) of the PDF matrix, $h_{mesurée}$ is the altitude measured with respect to the sea floor by means of the sounder, $p_{mesurée}$ is the depth of immersion of the mobile vehicle measured by means of a pressure sensor, $(x_{centre}, y_{centre})$ the geographical coordinates of the corresponding point in the geographical reference system at the centre of the PDF matrix, $h_{base\ de\ données}(\alpha,\beta)$ the altitude predicted based on the geographical data base at the point of geographical coordinates $(\alpha,\beta)$.

It is supposed herein that the EP matrix contains only a tidal error estimation at each point. In the case where the EP matrix contains at each point the estimation of several parameters, it is herein selected that which corresponds to the tide.

The PDF matrix is then updated using the conventional likelihood formulas:

$$PDF(a, b) \leftarrow \frac{1}{\sqrt{2\pi|\sigma^2(h) + \sigma^2(m)|}} \exp\left(-\frac{1}{2}\frac{(\delta h(a, b))^2}{\sigma^2(h) + \sigma^2(m)}\right) \times PDF(a, b)$$

where $\sigma^2(h)$ is the sounding measurement covariance and $\sigma^2(m)$ the tidal error estimation covariance (this covariance is identical for all the points of the EP matrix).

Given that the integral of the probability density has to be equal to one, the PDF matrix is normalised by multiplication of its coefficients by the suitable factor.

The EP matrix is then updated using the conventional linear filtering formulas:

$$EP(a, b) \leftarrow EP(a, b) + \frac{\sigma^2(m)}{\sigma^2(h) + \sigma^2(m)} \delta h(a, b)$$

Likewise, the covariance $\sigma^2(m)$ is updated by:

$$\sigma^2(m) \leftarrow \frac{\sigma^2(m)\sigma^2(h)}{\sigma^2(h) + \sigma^2(m)}$$

These formulas for updating the EP matrix and the covariance $\sigma^2(m)$ are the conventional so-called "Kalman filtering" formulas and are hence easily generalizable to the case where several error parameters have to be taken into account. The error covariance value $\sigma^2(m)$ is common to all the coefficients of the EP matrix and the same gain $$\frac{\sigma^2(m)}{\sigma^2(h) + \sigma^2(m)}$$

is used for all the coefficients. It is hence possible to generalize the use of the EP matrix in the case where it is necessary to estimate jointly several auxiliary error parameters without inducing that way a too high quantity of calculations.

Once a sounding measurement is performed, it is generally interesting to re-centre the grid and if possible to reduce the pitch thereof so as to obtain, for a given size of PDF matrix, the grid with the smallest pitch possible, which allows to estimate more finely the presence probability density and hence the statistical pool of errors. A very advantageous manner to implement this reduction consists in calculating the imprint of the statistical pool of errors corresponding to a fixed presence probability close to 1, for example 99%. The calculation of this statistical pool of errors based on the PDF matrix will be described hereinafter and it is supposed for the moment that it is acquired. The imprint of the statistical pool of errors is herein consisted of all the points of the PDF matrix having allowed to calculate the statistical pool of errors. Once calculated the imprint of the statistical pool of errors at the chosen probability, the new grid centre and the optimum pitch are determined so that the statistical pool of errors is exactly contained in the new grid. Then, the coefficients of the new PDF matrix are calculated by interpolation of the coefficients of the old PDF matrix, as described for example in the Bergman reference.

At each reception of a position variation estimation provided by the dead reckoning navigation system, the position of the grid centre on the map is updated by application of the same variation and the PDF matrix is updated by being convoluted with the position variation error probability density. Likewise, the EP matrix is convoluted with this same position variation error probability density.

The introduction of the EP matrix and the calculation pertaining thereto are new with respect to the state of the art and allow to better take into account the different parameters of error and in particular the errors of measurements of the environmental sensor (whether these errors are due to external phenomena as the tide or simply to the bias error of the sensor).

Generally, the errors of position variation from one instant to the other are not independent because they are determined in great part by phenomena having slow variations over time (for example, the current). To take into account this type of error, the filtering methods as shown hereinabove propose to add in the error model the speed error parameters. Unfortunately, the increase of the problem size that result therefrom leads to a combinatory explosion of the calculations and hence in practice to the impossibility to use in real time such a method. So as to take into account the speed error correlation over time, it is advantageous to modify the conventional formulas of determination of the position variation error covariance by determining this covariance not only from the instantaneous speed error covariance but also from the estimated position error covariance from the presence probability density. For example, circular errors of low-variation scalar covariance speed $\sigma^2(v_{LOG})$ and of random covariance $\sigma^2(\omega)$ are considered, a formula of the following type may be used:

$$\sigma^2(\Delta X) \leftarrow 2\sqrt{\sigma^2(v_{LOG})}\left(\sqrt{\sigma^2(X)}\right)\Delta t + (\Delta t)^2 \begin{bmatrix} \sigma^2(v_{LOG}) & 0 \\ 0 & \sigma^2(v_{LOG}) \end{bmatrix} + \Delta t \cdot \sigma^2(\omega)$$

where $\sigma^2(\Delta X)$ is the cumulated position error covariance, $\sqrt{\sigma^2(X)}$ is the square root of the estimated position error covariance and $\Delta t$ is the time interval between two updates. This type of formula allows, without overloading the calculation, to better take into account the accumulation of the time-correlated speed errors and hence finally avoids to under-estimate the statistical pool of errors.

Hence, the calculation of the mobile vehicle displacement uncertainty by combination of the speed uncertainty and of the mobile vehicle position uncertainty allows a better taking into account of the accumulation of the speed errors.

In the case where the parameters estimated by the EP matrix are liable to evolve over time, the covariance matrix of these parameters (common to all the points of the grid on which the presence probability density is estimated) is updated using the conventional linear filtering methodologies. For example, the evolution of the parameters of the EP matrix is modelled according to a Markov process of order 1 and the covariance and the value of the coefficients of the EP matrix are updated according to the corresponding formulas.

Once propagated the position error probability density, it may be necessary to increase the grid pitch so as to ensure that the PDF matrix allows to represent the whole probability density. Like for the reduction of the grid pitch, the statistical pool of errors corresponding to a fixed probability of presence close to 1 is first calculated. If one of the points of this statistical pool of errors is close enough to the edges of the grid matrix in the geographical reference system corresponding to the PDF matrix, it is chosen to increase the grid pitch by a previously defined factor.

Once these different steps performed, the storage memory contains a representation of the probability density of presence of the boat around each point of the map. The statistical pool of errors for the probability p corresponding to the safety parameter defined by the user is then determined. An efficient method allowing to determine this pool consists in sorting all the coefficients of the PDF matrix, then to determine the smallest sub-set of coefficients whose sum is higher than $p/\epsilon^2$. The statistical pool of errors is then the combination of the elementary zones of the grid around the coordinates of each of the points of the grid corresponding to a retained coefficient. For example, an elementary zone is defined as the square of side $\epsilon$, centred on each point. Given that the PDF matrix matches with the geographical map, the statistical pool of errors also matches with the geographical map and can hence be transmitted to the electronic mapping system to be displayed to the user.

It can be noted that, generally, the statistical pool of errors is not convex, and not connected either. The statistical pool of errors always contains the most likely position. On the other hand, the position estimated by the barycentre method may be outside the statistical pool of errors. If the user wants to simplify the display and accepts the corresponding compromise of performance, the different connected components can be combined and the statistical pool of errors can possibly be replaced by the smallest convex zone containing it.

The system and the method of the invention hence allow to determine and display for the navigator a safety zone corresponding accurately to the zone in which the boat is located, with a given presence probability.

FIG. 3 shows an example of geographic map, more precisely of bathymetric map indicating the isobath curves (215, 220, 225, 230, 235, 240, 245, 250) of a sea floor in coast zone. The hatched zone corresponds to a coast zone, and the line (200) to an isobath curve of null depth. The isobath curve (215) corresponds to a depth of 15 m, the isobaths curve (220) corresponds to a depth of 20 m, . . . and the isobath curve (250) corresponds to a depth of 50 m. In FIG. 3 are shown the estimated position and the simulation of safety zones (statistical pool of errors 12) calculated according to a preferred embodiment of the method of the invention based on a matrix of presence-probability-density estimation around the estimated position.

In FIG. 3 is shown a presence probability zone (12) calculated based on the presence probability density matrix at 99%. In this case, the pool of errors at 99% has a "bean" shape on the bathymetric map. It can be noted that the position (15) estimated by the least squares method (conventional method) is outside the statistical pool of errors (12). Indeed, the boat cannot be at this estimated position (15). Based on the estimated position (15), the boat would be close to the bathymetric curve (245) corresponding to a sea floor at 45 m, whereas it is possible, based on the statistical pool of errors (12), that the boat be on the bathymetric curve (235) corresponding to a sear floor at 35 m, which may represent a more significant danger for the navigation. The display of the statistical pool of errors (12) replaces very advantageously the display of the estimated position (15), which is then no longer necessary.

FIG. 4 shows the same geographical map as FIG. 3, with the same isobaths curves (215, 220, 225, 230, 235, 240, 245, 250). In FIG. 4 is shown the simulation of a safety zone (11) calculated based on an estimation of position and of error covariance around a position (15) estimated by the least squares mean (conventional method). FIG. 4 allows to compare the safety zone (12) determined at 99% according to the statistical pool method and a safety zone (11) calculated by the least squares method at 1 sigma. The safety zone (11) calculated by the least squares method at 1 sigma has an elliptic geometrical shape. It is noted that the 3-sigma ellipse would be three times greater than the safety zone (11) shown in FIG. 4.

In FIG. 4, it can be observed that the conventional method allows to show only ellipsoids (11), which has for effect to overestimate the size of the safety zones. On the contrary, in FIG. 4, it can be observed that the device allows to show more accurately the zone of probability of presence of the mobile vehicle (12).

Unlike the conventional pool of errors, the system does not lead to overestimate or underestimate the navigation zone corresponding to a given probability of presence. In particular, on the one hand, the determination of the statistical pool of errors is based on an accurate determination of the presence probability density, and on the other hand, its determination takes correctly into account the impact of the auxiliary errors as, for example, the tidal error.

Moreover, contrary to the navigation zones that may be determined from covariance indicators issued by the filtering methodologies, including non-linear methods, proposed in the literature, the statistical pool of error is not restricted to an ellipsoid shape, which leads to underestimate or overestimate the zone in which the boat is located, with a given presence probability.

In the zones showing a risk for the navigation and in particular by low depth or in presence of immersed obstacles, the system and the method hence very advantageously replace the conventional methods consisting in determining an estimation of position and an associated covariance. Once the crew trained to this zone navigation method, the system and the method allow to improve the navigation safety but also to extend the spectrum of the possible operations.

The whole process leading to the provision on the electronic map of the statistical pool of errors is fully automatic and requires no action from the navigator, which can concentrate on the safety of navigation.

Likewise, the system may be associated with automatic alarm devices allowing to trigger alarms for the navigator when the statistical pool of errors intersects a zone considered as a danger zone.

Although in the description the system determines only a single statistical pool of errors for a given presence probability, it is evident that several statistical pools of errors corresponding to different presence probabilities may be determined and displayed simultaneously without the background of the method is changed in any way. For example, it is possible to display simultaneously a pool of errors (12) corresponding to 99% of probability, and another statistical pool of errors corresponding to 50% of probability, of more limited extent than the pool of errors at 99%. The availability of several pools of errors with different presence probabilities, hence corresponding to more or less significant navigation risks, allows the navigator to take enlightened decisions when the safety of navigation enters into conflict with other imperatives of safety such as for example the necessity to rapidly move away from a given zone.

In the present description and for the sake of simplifying the description, the case considered is that in which the environmental sensor (30) is a sounder. Other sensors may be considered without the general principle of the system and the method is changed in any way. For example, the sounder may be replaced by a gravimeter and, in this case, the geographical data base contains at each point of the map the expected gravity field value. In another example, the sounder may be replaced by a sea current sensor and in this case the geographical data base contains at each point of the map the sea current value expected at a given instant. The use of other environmental sensors is also deduced by a simple transposition.

Several environmental sensors may be used jointly to participate to the estimation of the statistical pool of errors. In this case, it is advantageous to calculate a single PDF matrix common to the different sensors and it is enough, for adapting the method, to perform the step of probability density update for each of the sensors rather than for a single sensor.

In the example described in detail hereinabove, the EP matrix contains the estimation of only one auxiliary parameter: the tidal value. Other parameters may be added as a function of the imperatives of expected accuracy and of the environmental sensors used. For example, the EP matrix may contain an estimation of the systematic errors of the sounder or the gravimeter, an estimation of sound celerity in water, etc. More generally, the EP matrix may contain an estimation of each of the parameters affecting the measurement of the environmental sensor(s).

Although the description of the system and the method relates to the use for the navigation of boats and underwater vehicles, the system and the method can also apply to the case of terrestrial or aerial vehicles. In the case of such vehicles, it is interesting to use, using the same method, other types of environmental sensors as, for example, RADAR or LIDAR sensors.

The invention claimed is:

1. A navigation system for a mobile vehicle, adapted to determine and display a navigation safety zone for the mobile vehicle, the navigation system comprising:
   a dead reckoning navigation system adapted to produce a series of measurements of the mobile vehicle position variation over time,
   a calculator,
   a storage memory,
   an embedded sensor on-board the mobile vehicle to acquire a series of measurements of an environmental parameter as a function of time;
   an electronic mapping system comprising a display device and connected to a reference geographical data base of the environmental parameter, the electronic mapping system allowing to determine for each point of a geographical map the reference value of the environmental parameter,
   the calculator being connected to the storage memory, to the geographical data base, to the dead reckoning navigation system and to the electronic mapping system,
   wherein:
   the calculator is adapted to calculate the probability density of presence of the mobile vehicle around each point of the map at each instant t, based on the series of position variation measurements of the dead reckoning navigation system, on the series of measurements of the environmental parameter, and on the reference geographical data base of the environmental parameter, to deduce there from a safety zone corresponding to a presence probability higher than or equal to a predetermined threshold p,
   the electronic mapping system being adapted to represent said safety zone on the display device.

2. The navigation system according to claim 1, wherein, being determined a plurality of disjoined zones corresponding to a presence probability higher than or equal to a threshold p, the calculator is adapted to determine the smallest convex zone containing the disjointed zones and to form a convex safety zone.

3. The navigation system according to claim 1, wherein the mobile vehicle is a marine or underwater vehicle and the embedded sensor includes a depth sounder adapted to determine the depth of water under the marine or underwater mobile vehicle down to the sea floor, or a gravimetric sensor or a sea current sensor.

4. The navigation system according to claim 1, wherein the calculator is adapted to calculate a plurality of safety zones corresponding to different predetermined presence probability thresholds, respectively, and wherein the electronic mapping system is adapted to represent said plurality of safety zones on the display device.

5. The navigation system according to claim 1 wherein the mobile vehicle is a marine or underwater vehicle.

6. The navigation system according to claim 1, wherein p is 99%.

7. The navigation system according to claim 1, wherein the calculator is adapted to calculate a two-dimension presence-probability-density estimation matrix representing the probability density of presence of the mobile vehicle, each point of the presence-probability-density estimation matrix corresponding to a point of the geographical map defined by homothetic transformation of the spatial coordinates, each coefficient of the presence-probability-density estimation matrix corresponding to the probability of presence of the mobile vehicle in a square around this point, and wherein the storage memory is adapted to record at each instant said presence-probability-density estimation matrix.

8. The navigation system according to claim 7, wherein the calculator is adapted to:
   sort all the coefficients of the presence-probability-density estimation matrix of the mobile vehicle,
   determine the smallest sub-set of coefficients whose sum is higher than $p/\epsilon^2$, where $\epsilon$ is the pitch of the geographic grid corresponding to the elementary size of the squares of the probability density matrix,
   combine the elementary zones of the matrix around each of the retained coefficients,
   deduce at least one safety zone corresponding to a presence probability higher than or equal to a probability threshold p.

9. The navigation system according to claim 7, wherein the calculator is adapted to calculate recursively the probability density of presence of the mobile vehicle around each point of the map at each instant t, with the following processing steps:
   a step of initialization of the probability density based on an initial position uncertainty value;
   a step of correction of the probability density performed at each acquisition of a measurement of the environmental parameter;
   a step of propagation of the probability density performed at each acquisition of a measurement of the mobile vehicle position variation produced by the dead reckoning navigation system.

10. The navigation system according to claim 7, wherein the calculator is adapted to calculate an error matrix, of same size and same pitch as the presence-probability-density estimation matrix, each coefficient of the error matrix corresponding to an estimation of one or several auxiliary parameters of error of the system for each point of the map and wherein the storage memory is adapted to record said error matrix at each instant.

11. The system according to claim 10, wherein the step of propagation of the error matrix coefficients includes a step of convolution of the displacement error probability density with the error matrix.

12. The system according to claim 10, wherein the calculator is adapted to use a covariance value common to all the points of the error matrix, said covariance value being suitable to represent the uncertainty of the auxiliary parameter(s) at each point of the error matrix and wherein the step of correction is performed by means of a linear filtering process on each of the coefficients of the error matrix, said linear filtering process having a gain common to all the coefficients.

13. The navigation system according to claim 10, wherein the error matrix coefficients correspond to an estimation of the tidal error.

14. The navigation system according to claim 10, wherein the error matrix coefficients correspond to an estimation of the environmental sensor measurement error.

15. The navigation system according to claim 1, wherein the calculator is adapted to calculate recursively the probability density of presence of the mobile vehicle around each point of the map at each instant t, with the following processing steps:
 a step of initialization of the probability density based on an initial position uncertainty value;
 a step of correction of the probability density performed at each acquisition of a measurement of the environmental parameter;
 a step of propagation of the probability density performed at each acquisition of a measurement of the mobile vehicle position variation produced by the dead reckoning navigation system.

16. The system according to claim 15, wherein the step of propagation includes a step of calculation of mobile vehicle displacement uncertainty by combination of the mobile vehicle speed uncertainty and position uncertainty and wherein the step of propagation includes a step of convolution of the displacement error probability density with the presence probability density.

17. The navigation system according to claim 1, further including a device for predicting tidal values over time at the estimated position of the mobile vehicle.

18. The navigation system according to claim 17, wherein the device for predicting tidal values is a sounder or a gravimeter.

19. A navigation method for a mobile vehicle, the method being adapted to determine and display a navigation safety zone for the mobile vehicle, the navigation method comprising:
 the acquisition and storage in memory of a series of instantaneous speed and/or acceleration measurements issued by a dead reckoning navigation system, as a function of time,
 the acquisition and storage in memory of a series of measurements of an environmental parameter by an embedded sensor on-board the mobile vehicle as a function of time;
 the calculation at each instant t of the probability density of presence of the mobile vehicle around each point of the map, based on the series of position variation measurements by the dead reckoning navigation system, the series of measurements of the environmental parameter and the reference geographical data base of the environmental parameter,
 the determination of a safety zone corresponding to a presence probability higher than or equal to a predetermined threshold p, and
 the representation on a display device of a reference geographical map of the environmental parameter of said safety zone.

20. The navigation method according to claim 19 wherein the mobile vehicle is a marine or underwater vehicle.

* * * * *